United States Patent
Anderson et al.

(10) Patent No.: US 9,127,881 B2
(45) Date of Patent: Sep. 8, 2015

(54) POINT OF DISPENSE CHILLING FOR BLENDED ICED BEVERAGE MACHINES

(75) Inventors: Douglas Anderson, St. Charles, IL (US); Nikolay Popov, Naperville, IL (US); Shaji Kulangara Veettil, Kerala (IN); Neravati Sudhir Kumar, Karnataka (IN); James E. Gooding, III, Mechanicsville, VA (US); Santhosh Kumar, Naperville, IL (US)

(73) Assignee: Cornehus, Inc., St. Paul, MN (US)

( * ) Notice: Subject to any disclaimer, the term of this patent is extended or adjusted under 35 U.S.C. 154(b) by 443 days.

(21) Appl. No.: 12/802,409

(22) Filed: Jun. 7, 2010

(65) Prior Publication Data

US 2011/0061420 A1 Mar. 17, 2011

Related U.S. Application Data

(60) Provisional application No. 61/268,332, filed on Jun. 11, 2009, provisional application No. 61/269,513, filed on Jun. 25, 2009.

(51) Int. Cl.

| | |
|---|---|
| *F25D 23/12* | (2006.01) |
| *A23G 9/04* | (2006.01) |
| *A23G 9/28* | (2006.01) |
| *B67D 1/00* | (2006.01) |
| *B67D 1/08* | (2006.01) |
| *F25D 31/00* | (2006.01) |

(52) U.S. Cl.
CPC .............. *F25D 23/126* (2013.01); *A23G 9/045* (2013.01); *A23G 9/28* (2013.01); *B67D 1/0021* (2013.01); *B67D 1/0868* (2013.01); *F25D 31/002* (2013.01)

(58) Field of Classification Search
USPC ......... 62/1, 390, 393, 396, 398; 222/146.6, 1; 22/146.6, 1
See application file for complete search history.

(56) References Cited

U.S. PATENT DOCUMENTS

| | | | | |
|---|---|---|---|---|
| 3,724,235 | A | * | 4/1973 | Carpigiani ...................... 165/61 |
| 4,300,359 | A | * | 11/1981 | Koeneman et al. ............. 62/379 |
| 4,730,463 | A | | 3/1988 | Stanfill |
| 4,949,552 | A | | 8/1990 | Adams |
| 5,009,082 | A | | 4/1991 | Abraham, III |

(Continued)

FOREIGN PATENT DOCUMENTS

GB 2449574 11/2008

OTHER PUBLICATIONS

MEGABlender, Dec. 8, 2002, Blendtec.*

*Primary Examiner* — Mohammad M Ali
*Assistant Examiner* — Raheena Rehman
(74) *Attorney, Agent, or Firm* — Andrus Intellectual Property Law, LLP (57) ABSTRACT

A machine for dispensing blended iced beverages is characterized by a cabinet for storing a plurality of supplies of beverage ingredients and a refrigeration system for chilling an interior of the cabinet to chill the beverage ingredient supplies. A duct extends between the cabinet interior and a remote point of delivery of the beverage ingredients and a tubing bundle extends from the supplies and through the duct to the delivery point to deliver beverage ingredients from the supplies to the delivery point. The interior of the duct is chilled to chill the tubing bundle and beverage ingredients in the tubing bundle, so that chilled beverage ingredients are always provided to the point of delivery, even when the machine is idle for an extended period of time. Various techniques are provided for chilling the interior of the duct.

11 Claims, 10 Drawing Sheets

(56) References Cited

U.S. PATENT DOCUMENTS

| | | | | |
|---|---|---|---|---|
| 5,159,818 A | * | 11/1992 | Etou et al. | 62/137 |
| 5,549,219 A | * | 8/1996 | Lancaster | 222/1 |
| 5,564,602 A | | 10/1996 | Cleland et al. | |
| 5,950,866 A | * | 9/1999 | Lancaster | 222/1 |
| 5,967,226 A | * | 10/1999 | Choi | 165/63 |
| 5,987,900 A | * | 11/1999 | Love | 62/66 |
| 6,220,047 B1 | * | 4/2001 | Vogel et al. | 62/342 |
| 6,360,556 B1 | * | 3/2002 | Gagliano | 62/396 |
| 6,463,753 B1 | * | 10/2002 | Haskayne | 62/389 |
| 6,616,011 B2 | * | 9/2003 | Derry et al. | 222/1 |
| 6,832,487 B1 | * | 12/2004 | Baker | 62/115 |
| 6,880,358 B2 | * | 4/2005 | Lucas et al. | 62/344 |
| 6,990,391 B1 | * | 1/2006 | Cunha et al. | 700/237 |
| 7,032,781 B2 | * | 4/2006 | Van Der Klaauw et al. | 222/146.6 |
| 7,140,514 B2 | * | 11/2006 | Van Der Klaauw et al. | 222/146.6 |
| 7,269,960 B2 | * | 9/2007 | Elsom et al. | 62/98 |
| 7,272,951 B2 | * | 9/2007 | Kyees | 62/390 |
| 7,373,784 B2 | | 5/2008 | Haskayne | |
| 7,389,647 B1 | | 6/2008 | Abraham, III | |
| 2008/0178607 A1 | | 7/2008 | Schneller et al. | |

* cited by examiner

POINT OF DISPENSE CHILLING FOR BLENDED ICED BEVERAGE MACHINES

This application claims benefit of provisional application Ser. No. 61/268,332, filed Jun. 11, 2009, and of provisional application Ser. No. 61/269,513, filed Jun. 25, 2009.

BACKGROUND OF THE INVENTION

The present invention relates to dispensing blended iced beverages, and in particular to an apparatus for and method of mixing and dispensing blended iced beverages in which supplies of beverage product components are chilled and maintained chilled while being delivered to a point of dispense at a dispensing station.

Machines for mixing and dispensing iced beverages have long been known. In recent years, beverages comprising fruit juice or fruit drink that is blended along with ice have become popular. If the drink includes ice cream or yogurt, it is called a smoothie, which is a non-carbonated drink that usually contains fruit or a mixture of different fruits that along with crushed or shaved ice are pulverized by a blender to almost liquid form and served at a freezing temperature to include ice crystals. A customary method of preparing a smoothie with a smoothie machine is to place the beverage product ingredients in a blender at a blending station and then blend the ingredients to a point where the ice is pulverized and evenly dispersed throughout the resulting beverage product.

Smoothie machines normally include a lower housing portion for storage of supplies of beverage ingredients and an upper housing portion for holding a supply of ice for use in the preparation of smoothie beverages, which ice may be manufactured by an integrated icemaker and refrigeration system. A dispense station is at a front of the upper housing portion, along with a beverage component blending station and, desirably, a rinsing station for cleaning the mixing containers used in the blending of smoothie beverages for service to customers. Beverage ingredients, which can include syrup concentrate, fruit juice and water, are delivered through tubing from the supplies in the lower cabinet to the dispensing station at the lower front of the upper cabinet, and ice also is delivered to the dispensing station from a supply of ice that usually is contained in the upper cabinet. Means are provided for crushing or shaving the ice and for metering the amounts of ice, water and beverage ingredients delivered from the mixing station into a mixing container, in accordance with the particular smoothie to be prepared.

For proper consistency and quality, the blended iced beverage or smoothie served to a customer must be at the freezing temperature. This requires that the water and beverage ingredients, as delivered to the dispensing station, be sufficiently cold, since otherwise the ice portion of the beverage will melt excessively when mixed with water and other beverage ingredients and the quality of the smoothie beverage will be degraded. More importantly, since an ingredient of a smoothie is a perishable dairy product such as milk or yogurt, which can spoil if not kept sufficiently cold, National Sanitation Foundation Standards require that the dairy product be kept sufficiently chilled, both in storage and as delivered to the dispensing station. Consequently, some means must be provided to chill not only the supplies of beverage ingredients in the lower cabinet, but also to maintain the beverage ingredients cold as they are delivered through the tubing to the dispense station.

OBJECT OF THE INVENTION

A primary object of the present invention is to provide a smoothie machine having an improved chilling system for maintaining beverage ingredients cold both as stored in the machine and as delivered to a beverage dispensing station of the machine.

SUMMARY OF THE INVENTION

In accordance with the present invention, there is provided a machine for dispensing blended iced beverages. The machine comprises a cabinet for storing a plurality of supplies of beverage ingredients; means for chilling an interior of the cabinet to chill the supplies of beverage ingredients therein; a duct extending between the cabinet and a beverage ingredient point of delivery remote from the cabinet; and a tubing bundle extended through the duct between the cabinet and the point of delivery, the tubing bundle comprising a plurality of tubes, individual ones of which have inlets for connection to outlets from associated ones of the beverage ingredient supplies and outlets for being coupled to inlets to associated ones of a plurality of beverage ingredient dispensing valves at the point of delivery. The machine also comprises means for delivering beverage ingredients from the supplies thereof through the tubing bundle to the point of delivery; and means for chilling an interior of the duct and the tubing bundle within the duct to chill beverage ingredients in the tubing bundle at the point of delivery.

In one embodiment of the machine, the means for chilling includes means for flowing chilled air from the cabinet through the duct.

In another embodiment, the means for chilling includes a refrigeration system having an evaporator heat transfer coupled to the duct.

In a further embodiment, the machine holds ice for being dispensed into a beverage and has beverage dispense valves at the point of delivery that dispense beverage ingredients received from the tubing bundle, and the means for chilling includes a thermally conductive member heat transfer coupled between the ice and each of the duct interior and beverage dispense valves at the point of delivery.

The invention also contemplates a method of dispensing blended iced beverages, which comprises the steps of storing a plurality of supplies of beverage ingredients in a cabinet; chilling an interior of the cabinet to chill the supplies of beverage ingredients; extending a duct between the cabinet interior and a point of beverage ingredient delivery remote from the cabinet; and routing a tubing bundle through the duct between the cabinet interior and the point of delivery, the tubing bundle comprising a plurality of tubes, individual ones of which tubes have inlets for connection to outlets from associated ones of the beverage ingredient supplies and outlets for connection to inlets to associated ones of a plurality of beverage ingredient dispensing valves at the point of delivery. The method also comprises the steps of delivering beverage ingredients from the supplies thereof through the tubing bundle to the beverage dispense valves; and chilling an interior of the duct and the tubing bundle within the duct to chill beverage ingredients in the tubing bundle at the point of delivery.

In one embodiment of the method, the chilling step comprises flowing chilled air from the cabinet through the duct.

In another embodiment, the chilling step includes heat transfer coupling an evaporator of a refrigeration system to the duct.

In a further embodiment, the method includes the steps of storing ice for use in making blended iced beverages, and the chilling step comprises heat transfer coupling a thermally conductive member between the ice and each of the interior of the duct and the beverage dispense valves at the point of delivery.

DETAILED DESCRIPTION

Figure 1:
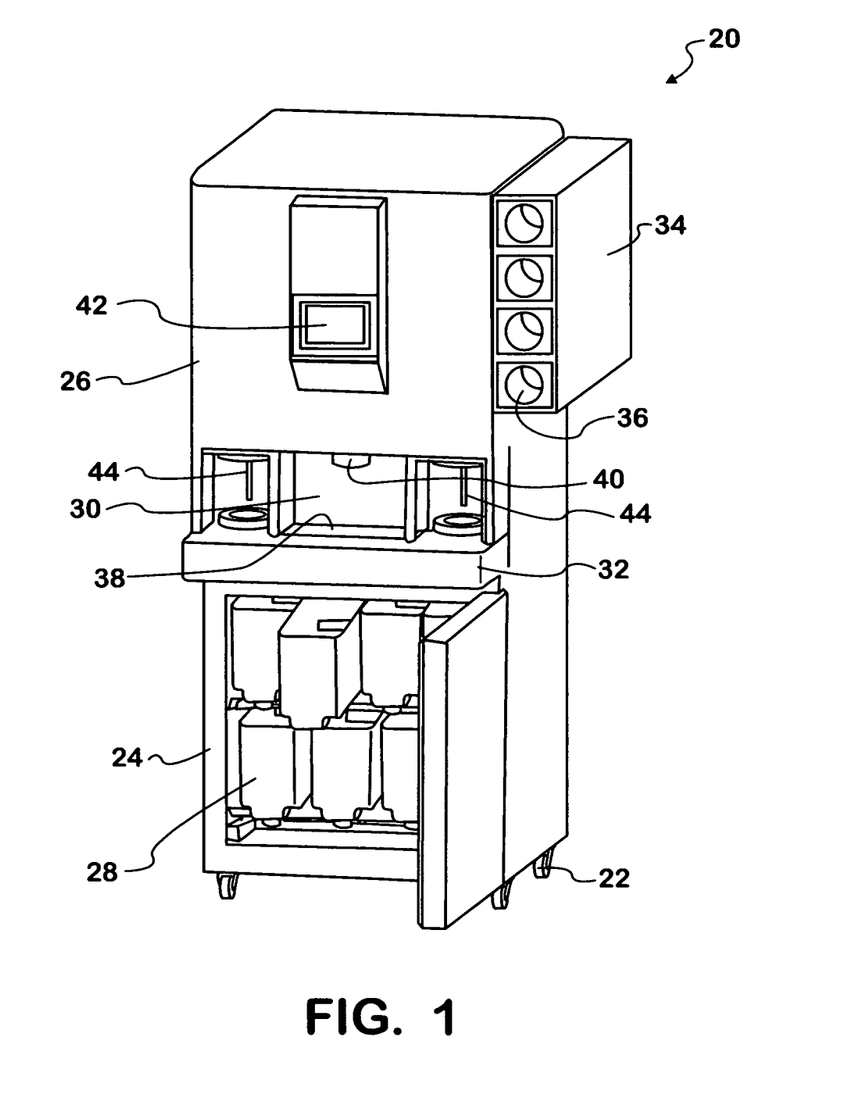
FIG. 1 is a pictorial representation of a smoothie machine for dispensing blended iced beverages, of a type with which the teachings of the invention may be used.

There is shown in FIG. 1 and indicated generally at 20 a blended iced beverage preparing apparatus or machine, such as a smoothie machine. The machine, which is adapted to sit on a floor of a food service establishment and may have casters 22 to facilitate its movement, includes a lower housing or cabinet portion 24 and an upper housing or cabinet portion 26. The lower cabinet 24 is receives and stores a plurality of supply containers 28 of beverage ingredients. The beverage ingredients may include fruit juices, fruit drinks, concentrated beverage syrups and/or water, and a refrigeration system (not shown in FIG. 1) is provided for chilling the cabinet and the supplies of beverage ingredients in the cabinet. The refrigeration system can optionally be contained within the lower cabinet 24, within the upper cabinet 26, on top of the upper cabinet or remote from the dispenser 20.

The upper cabinet 26 contains an ice storage area (not shown) such as an ice storage bin or hopper, along with an icemaker coupled to the refrigeration system for manufacturing ice for introduction into the bin, all in a manner well understood by those of skill in the ice dispensing art. A beverage ingredients dispensing station 30 is at a lower front center of the upper cabinet and a shelf or cup support 32 is between the machine lower and upper cabinets 24 and 26. A cup dispenser 34 may be on the side of the machine 20 and holds a plurality of cups 36 of different sizes for use in the service of beverages to customers.

To prepare a blended iced beverage for service to a customer, a container (not shown in FIG. 1) in which the smoothie is to be prepared is placed on a grate 38 at the beverage ingredients dispensing station 30. Beverage ingredients from the beverage ingredient supply containers 28 in the lower cabinet 24 are delivered through tubing (not shown in FIG. 1) to inlets to associated valves (not shown) at a point of dispense in the upper cabinet 26, outlets from which valves are located above the beverage ingredients dispense station 30. An outlet from an ice dispense chute 40 also is located above the beverage ingredients dispense station, so that with the container placed at the station, it is positioned to receive beverage ingredients dispensed by the valves and ice dispensed from the ice dispense chute. A user interface 42 on a front face of the machine upper cabinet 26 is coupled to a controller for the valves and ice chute and has user actuable switches that control the valves and ice chute, so that particular beverage ingredients and quantities of ingredients for preparing a selected blended iced beverage are dispensed into the container.

To control or meter the quantities of beverage ingredients from the supplies 28 that are dispensed into a container, the valves may be actuated for selected times, or fluid flow meters may be used. To control the quantity of ice dispensed into the container, an ice portion control of a type as disclosed in U.S. Pat. No. 4,921,149 may be used, the teachings of which are incorporated by reference. In essence, to dispense a predetermined quantity of ice, a gate at a lower end of the ice chute 40 is closed while the chute is filled with ice, and the gate is then opened for a time selected such that the predetermined quantity of ice flows out of the chute and into the container before the gate is again closed. Means are provided for crushing or shaving the ice that is delivered into the chute for being introduced into the container. Fruit can be manually added, as desired, into the container.

Two blending and rinsing stations 44 are on the front of the smoothie machine 20 to opposite sides of the beverage ingredients dispensing station 30. After selected predetermined quantities of beverage ingredients are introduced into a container at the dispensing station, the container is moved to one of the blending and rinsing stations, each of which includes means for blending the beverage ingredients in the container to produce a blended iced beverage or smoothie. Such blending means can include an agitator at the station that is extendable into the beverage ingredients in the container for blending the same or the container can itself include an agitator to blend the ingredients and that is coupled with drive means when the container is placed at the blending and rinsing station. After the ingredients are blended they are poured from the container into a cup obtained from the cup dispenser 34, and served to a customer. The container is then returned to one of the blending and rinsing stations, which stations also include means for rinsing and cleaning the interior of the container, so that it might be used in preparation of the next blended iced beverage.

The resulting smoothie, which has been pulverized by a blender to almost liquid form should, for proper quality, be served at freezing temperature and include ice crystals. For this quality standard to be met, it is necessary that the beverage ingredients be sufficiently cold as delivered to the beverage ingredient dispensing station 30, since if the beverage ingredients are allowed to warm and are not sufficiently cold, the ice will excessively melt, resulting in a thin beverage that does not have ice crystals. The invention therefore contemplates an apparatus for and method of maintaining the beverage ingredients at a properly cold temperature both as stored in the lower cabinet 24 and as delivered to the point of dispense at the beverage ingredient dispensing station 30.

Figure 2:
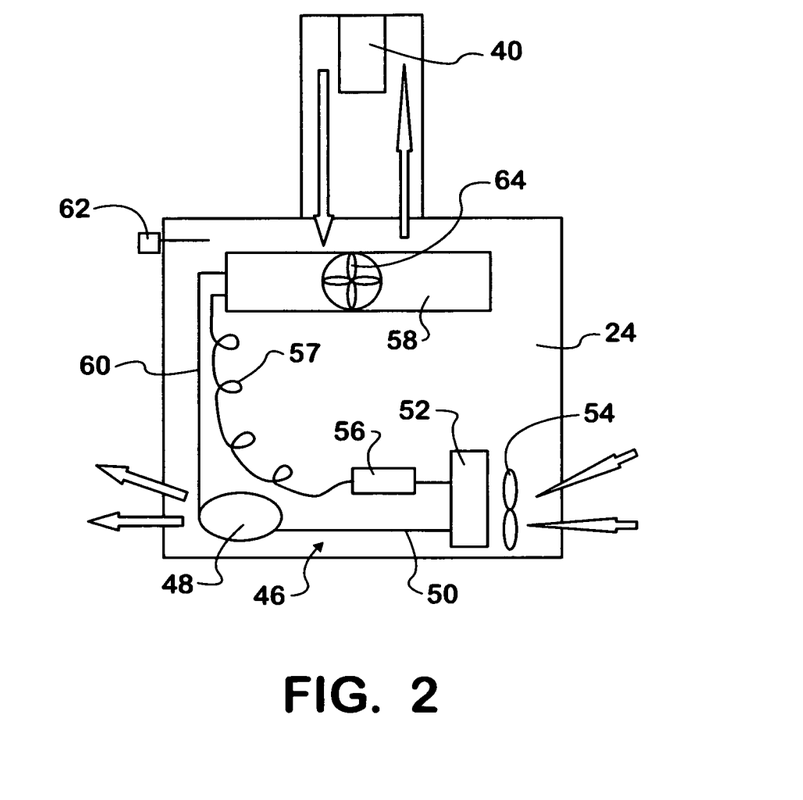
FIG. 2 is a schematic representation of a contemplated embodiment of cooling system according to the invention, for use with the FIG. 1 machine to chill both beverage ingredient supplies stored in the machine and beverage ingredients as they are delivered from the supplies to a point of dispense.

FIG. 2 shows a contemplated technique for keeping beverage ingredients at a cold temperature both in the smoothie machine lower cabinet 24 and as delivered from the lower cabinet to the point of dispense at the beverage ingredient dispensing station 30. According to this technique a refrigeration system, indicated generally at 46, may be in the lower cabinet 24. The refrigeration system includes a compressor 48, hot refrigerant at an outlet from which is delivered through a refrigerant line 50 to an inlet to a condenser 52, through which condenser the refrigerant flows and is cooled by air moved by a fan 54 through the condenser. Cooled refrigerant at an outlet from the condenser is delivered through a filter/dryer 56 and an expansion device or capillary tube 57 to an inlet to an evaporator 58 to chill the evaporator, with refrigerant exiting the evaporator being returned to an inlet to the compressor 48 through a refrigerant line 60. Since the evaporator is in the lower cabinet 24, it chills the cabinet interior and the beverage ingredient supply containers stored in the cabinet. A selected temperature in the cabinet is maintained by a thermostat 62 that controls operation of the refrigeration system. While the refrigeration system is shown as being located within the lower cabinet 24, except for the evaporator 58 the remainder of the refrigeration system could be located elsewhere, such as in or on top of the upper cabinet 26. Also, through the use of appropriate valving to switch delivery of refrigerant at the outlet from the condenser 52, the refrigerant system could also be used chill an icemaker that makes ice for an ice storage bin in the upper cabinet.

Beverage ingredients are delivered through tubing from the supplies 28 of beverage ingredients in the lower cabinet 24 to the point of dispense of beverage ingredients in the upper cabinet 26, above the beverage ingredients dispense station 30. To keep the ingredients cold while they are being delivered from the supplies to the point of dispense, according to the invention the tubing is routed through a primary duct extending between the interior of the lower cabinet and the point of dispense in the upper cabinet and cold air from the lower cabinet, chilled by the evaporator 58, is moved through the duct by a fan 64 to chill the tubing and beverage ingredients in the tubing. According to one aspect of the invention, the primary duct is enveloped or surrounded by a secondary duct that provides a return path for the air being pushed by the fan through the primary duct. According to another aspect of the invention, the secondary duct is a continuation of the primary duct and provides a return path for air back into the lower cabinet 24. These two arrangements of ducts are shown in FIGS. 3, 4*a*-*b*, 5*a*-*b* and 6.

Figure 3:
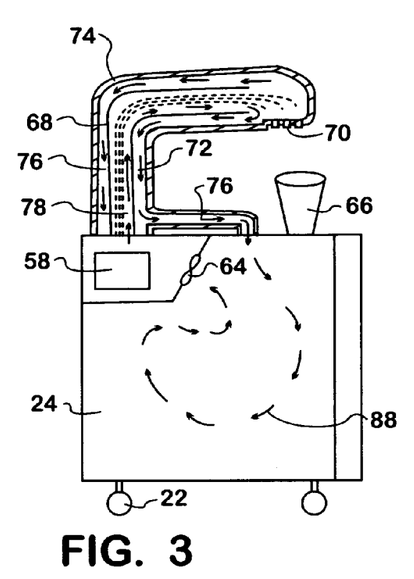
FIG. 3 shows one contemplated manner in which the invention may be implemented to chill beverage components as they are delivered from the beverage ingredient supplies to the point of dispense.

FIG. 3 shows the embodiment of the invention in which air chilled by the heat exchanger or evaporator 58 in the lower cabinet 24 is delivered through a primary duct 68 from the lower cabinet to a point of delivery 70 in the upper cabinet 26, as shown by arrows 72, and then returns to the lower cabinet through a secondary duct 74 that surrounds the primary duct 68 and defines between it and the primary duct a space or generally cylindrical passage through which the air returns, as shown by arrows 76. A tubing bundle 78 is routed through the primary duct 68 between the lower cabinet 24 and the point of dispense 70. Inlets to individual ones of the tubes of the bundle are connected to outlets from associated ones of the supplies 28 of beverage ingredients, outlets from individual ones of the tubes are connected to inlets to beverage ingredient dispense valves (not shown), and outlets from the valves are directed downward from the point of delivery 70 to deliver beverage ingredients through an opening in the secondary duct 74 and into the container 66. Suitable means, such as $CO_2$ operated pumps (not shown), are provided to deliver beverage ingredients from their supplies and through the tubes of the tubing bundle to and through the valves for introduction into the container for use in preparing a smoothie beverage for a customer. The cold air flowed through the primary duct 68 chills the beverage ingredients delivered through the tubes of the tubing bundle 78, as well as the valves to which the tubes connect, so that beverage ingredients flowed to the point of delivery are always cold, even when the machine 20 has been idle for an extended period of time. It is to be appreciated that the secondary duct 74 returns air to the interior of the lower cabinet at a location away from the inlet to the primary duct 68, so that air in the lower cabinet is given a swirling or circulatory motion and flows throughout the entirety of the interior of the cabinet to thoroughly and uniformly chill the beverage ingredient supplies 28 in the cabinet.

Figure 4A:
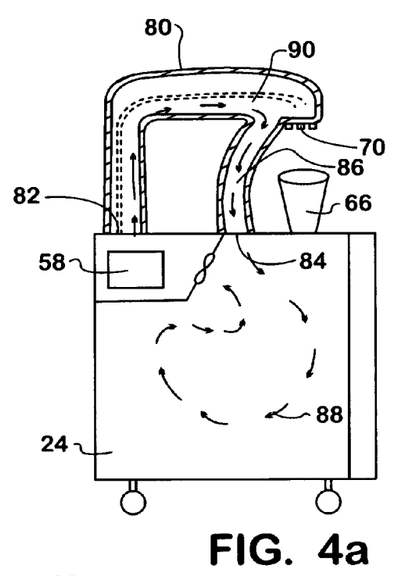
FIGS. 4a-b shows another manner of implementing the invention.
Figure 4B:
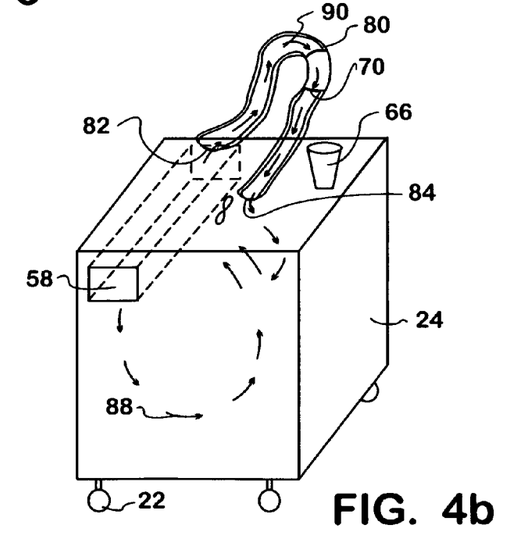

The embodiment of invention shown in FIGS. 4*a*-*b* uses a single primary duct 80 to conduct cold air from the lower cabinet 24 to chill a tubing bundle 90 extended through the duct and then return the air to the lower cabinet. The duct 80 has an inlet 82 in communication with the interior of the cabinet and located at or adjacent to the evaporator 58, such that air is moved by the fan 64 to and through the inlet to the duct. The duct extends from its inlet to the point of delivery 70, and then from the point of delivery to an outlet 84 from the duct in communication with the interior of the lower cabinet at a location away from the inlet to the duct. An advantage to staggering the duct inlet 82 and outlet 84 relative to the lower cabinet is that as cold air is circulated through the duct and returned to the cabinet, the air in the cabinet is given a swirling motion, as shown by arrows 88, so that it flows throughout the entirety of the interior of the cabinet to thoroughly and uniformly chill the beverage ingredient supplies 28 in the cabinet. Individual ones of the tubes of the tubing bundle 90 deliver beverage ingredients from their supplies to associated beverage dispense valves for dispensing of beverage ingredients from the valves and through an opening in the duct 80 at the point of delivery and into the container 66. As for the FIG. 3 embodiment, in FIGS. 4*a*-*b* the tubing bundle 90 and the beverage ingredients delivered through it to the point of delivery are maintained cold by cold air flowing through the duct 80, so that cold ingredients are always introduced into the container 66, even when the machine 20 has not been used for an extended time.

Figure 5A:
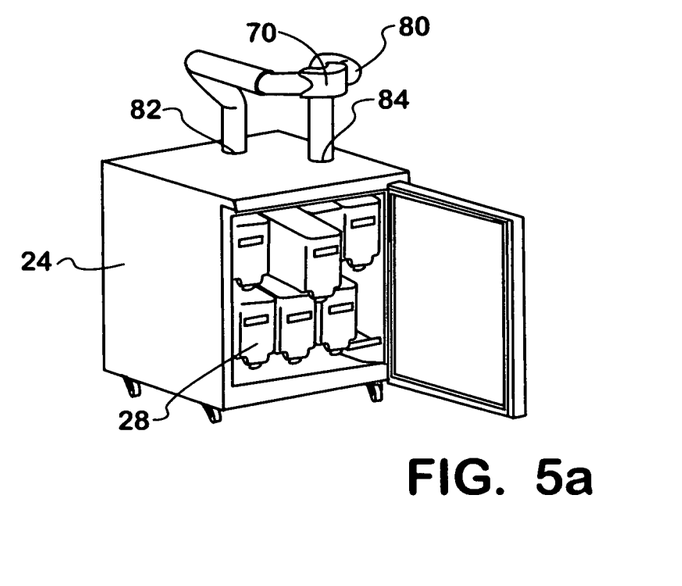
FIGS. 5a-b are pictorial representations of an implementation of the invention in the manner as shown in FIGS. 4a-b.
Figure 5B:
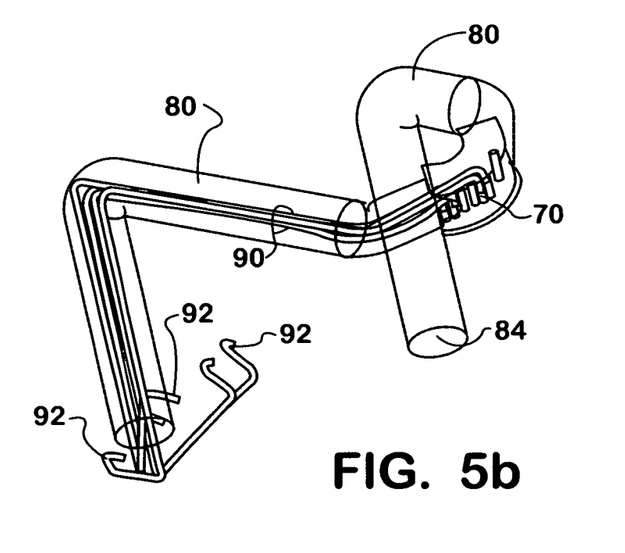
Figure 6:
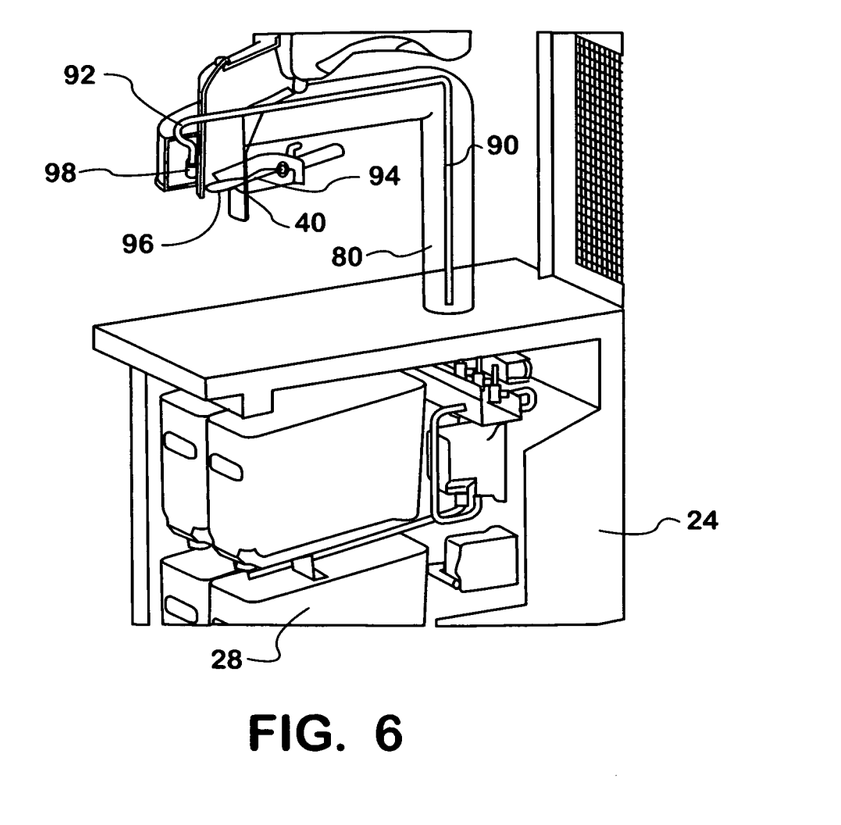
FIG. 6 is a pictorial cross-sectional representation of an implementation of the invention in a manner as shown in FIGS. 4a-b.

FIGS. 5*a*-*b* and 6 pictorially show the FIGS. 4*a*-*b* embodiment of the invention. FIG. 5*b* better shows individual ones of tubes 92 of the tubing bundle 90. FIG. 6 better shows the ice dispense chute 40, including a solenoid 94 for moving a gate 96 out of a lower part of the chute 40 for a time selected to dispense a predetermined quantity of ice from the chute, and then back into the chute to terminate dispense of ice. FIG. 6 also shows a beverage ingredient dispense valve 98 of the plurality of valves associated with individual ones of the tubes 92.

It is understood that, although not shown, the secondary duct 74 of FIG. 3, and the duct 80 of FIGS. 4*a*-*b*, 5 and 6, are thermally insulated.

Figure 7:
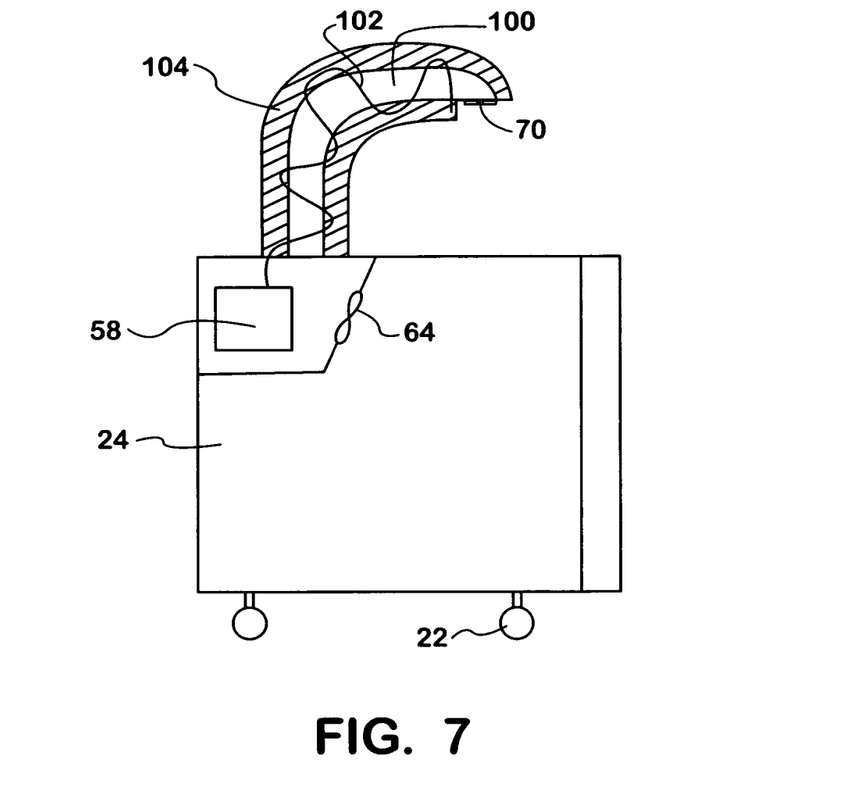
FIG. 7 shows another embodiment of the invention for chilling beverage ingredients as they are delivered from supplies thereof to a point of dispense.

In the FIG. 7 embodiment of invention, the tubing bundle extends through a duct 100 to the point of delivery 70. However, unlike the embodiments in which cold air from the lower cabinet 24 is flowed through the duct to chill the tubing bundle within the duct, in FIG. 7 the duct itself and therefore the interior of the duct is chilled by an evaporator coil 102 wrapped around and in thermal heat transfer contact with the duct. For thermal efficiency, the duct and evaporator coil are surrounded by insulation 104.

In the embodiment of invention shown in FIGS. 8*a*-*d* and 9*a*-*b*, beverage ingredient dispense valves 108 and air in the duct 80 are both chilled by heat transfer coupling a thermally conductive member 110 between ice in the ice chute 40 and each of the dispense valves and air in the duct at the point of delivery 70 of beverage ingredients. Ice in the chute 40 is obtained from an ice bin 112 that holds a supply of ice pieces for delivery into the ice chute. The ice bin is in the upper cabinet 26 above the chute and has an ice outlet opening 114 toward its lower end through which ice pieces are delivered into a conduit 116 for gravitational flow through the conduit into an upper inlet end to the ice chute to fill the chute with ice. Ice in the chute is then dispensed from the chute and into the container 66 in metered quantities in the preparation of blended iced beverages for customers. Metered ice dispensing is accommodated by an ice dispense gate 118 at a lower outlet end of the chute, which gate normally closes the chute but may be moved out of the chute by a cylinder, only a rod 120 of which is shown, to open the outlet from the chute to dispense ice, and then moved by the cylinder back into the chute to terminate dispense of ice. As above described, dispensing selected metered quantities of ice is accomplished by operating the gate to open the chute for predetermined times.

Figure 8A:
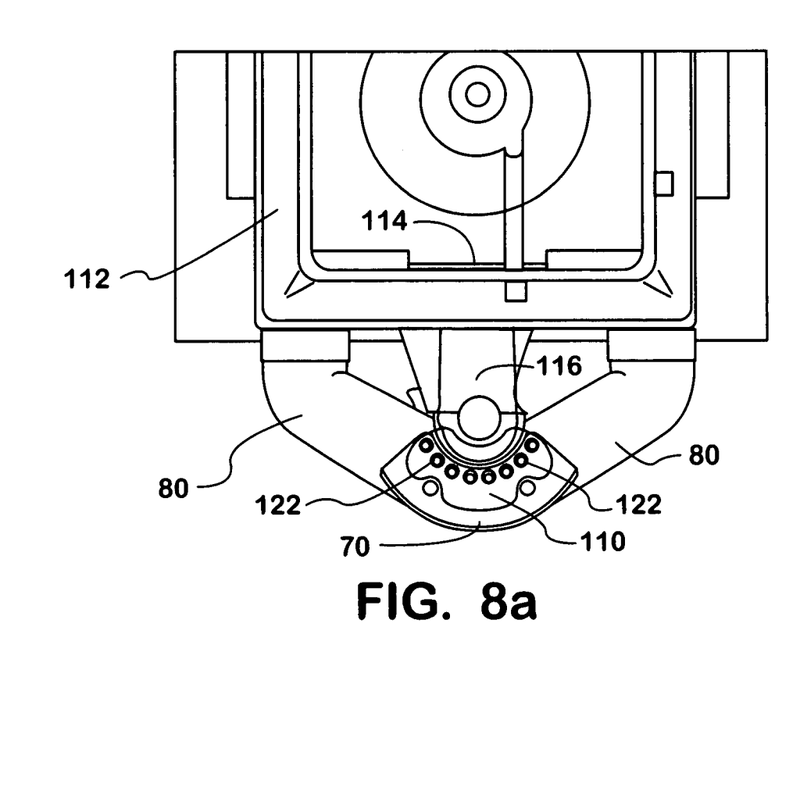
FIGS. 8a-d are pictorial representations a further embodiment of the invention for chilling beverage ingredients at a point of dispense.
Figure 8B:
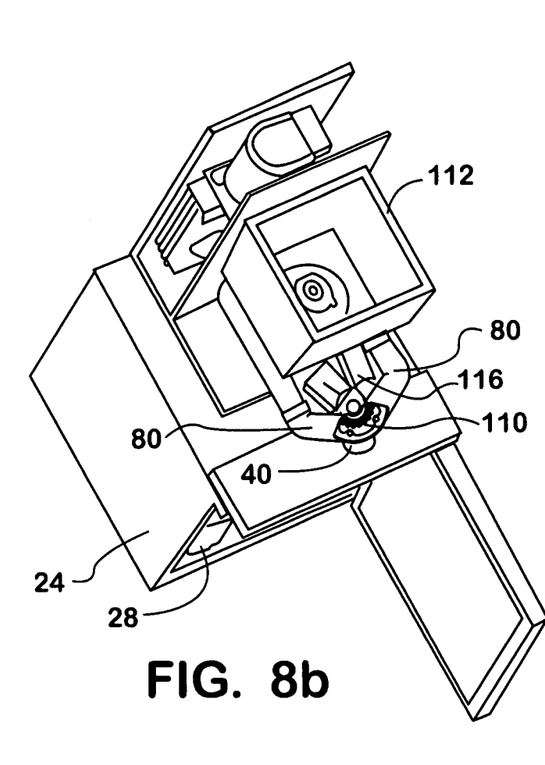
Figure 8C:
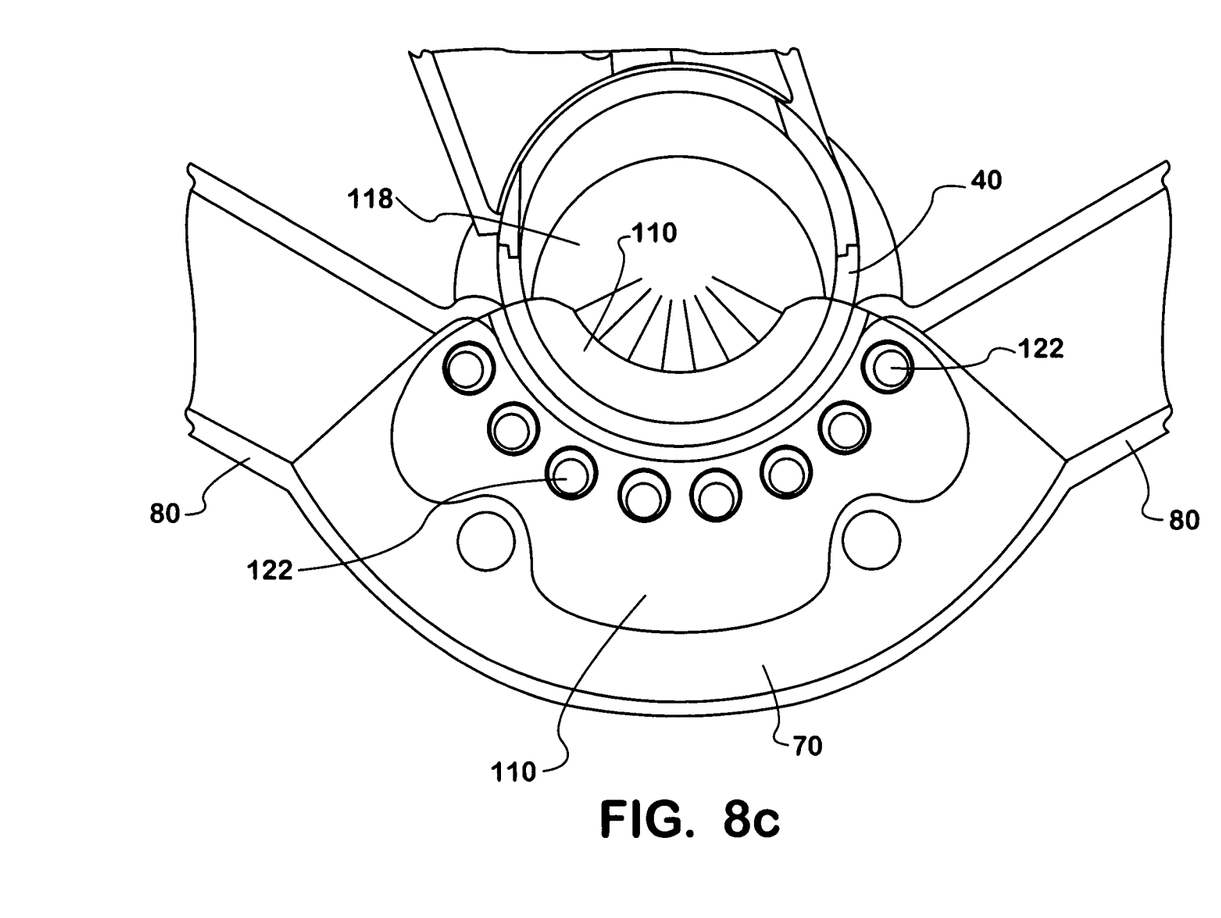

The thermally conductive member 110 may be made of aluminum and the member passes through adjacent walls of each of the ice chute 40 and duct 80, such that the aluminum member extends into and between each of the ice chute and duct at the level of the ice chute gate 118. When the gate is moved into the ice chute to close the chute, it moves and closes against the face of the portion of the thermally conductive member 110 that extends into the chute, and the gate and portion of the member are therefore provided with facing surfaces that are complementary in shape, as best seen in FIG. 8c. The portion of the thermally conductive member that extends into the duct is provided with a plurality of passages 122 into and through which the beverage dispense valves 108 extend in relatively tight thermally conductive contact with surfaces of the passages.

Figure 8D:
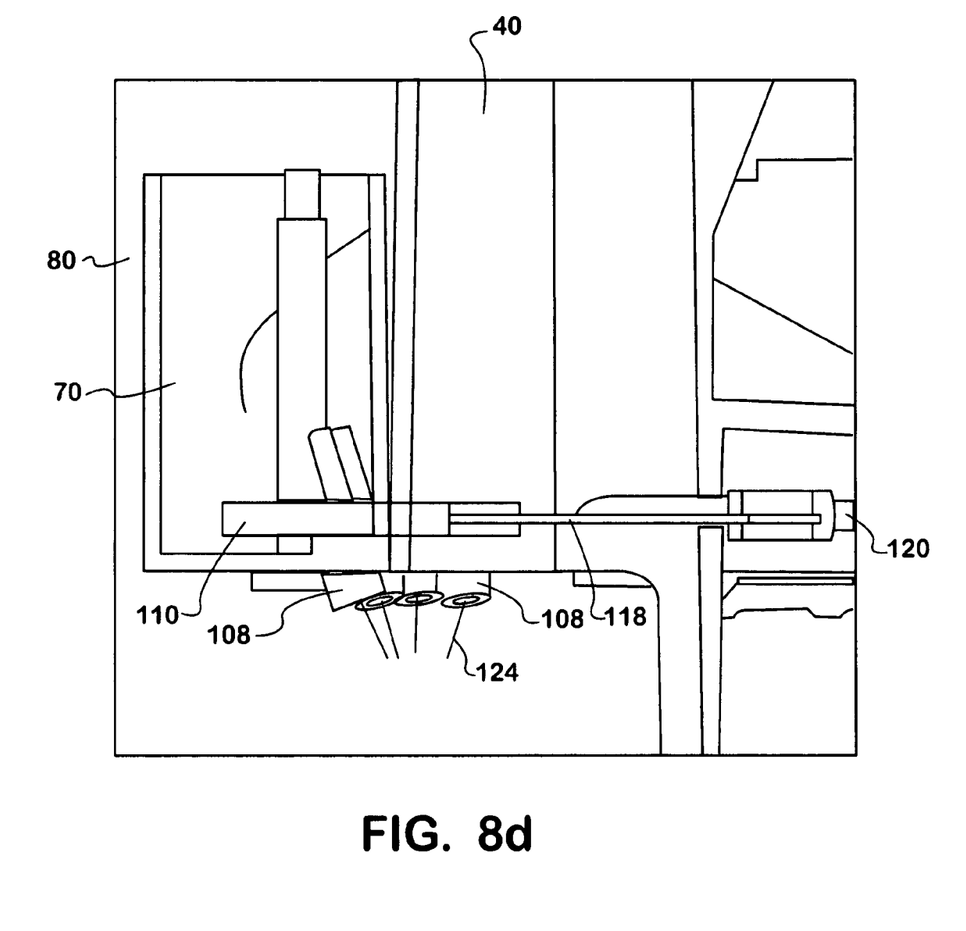
Figures 9A, 9B:
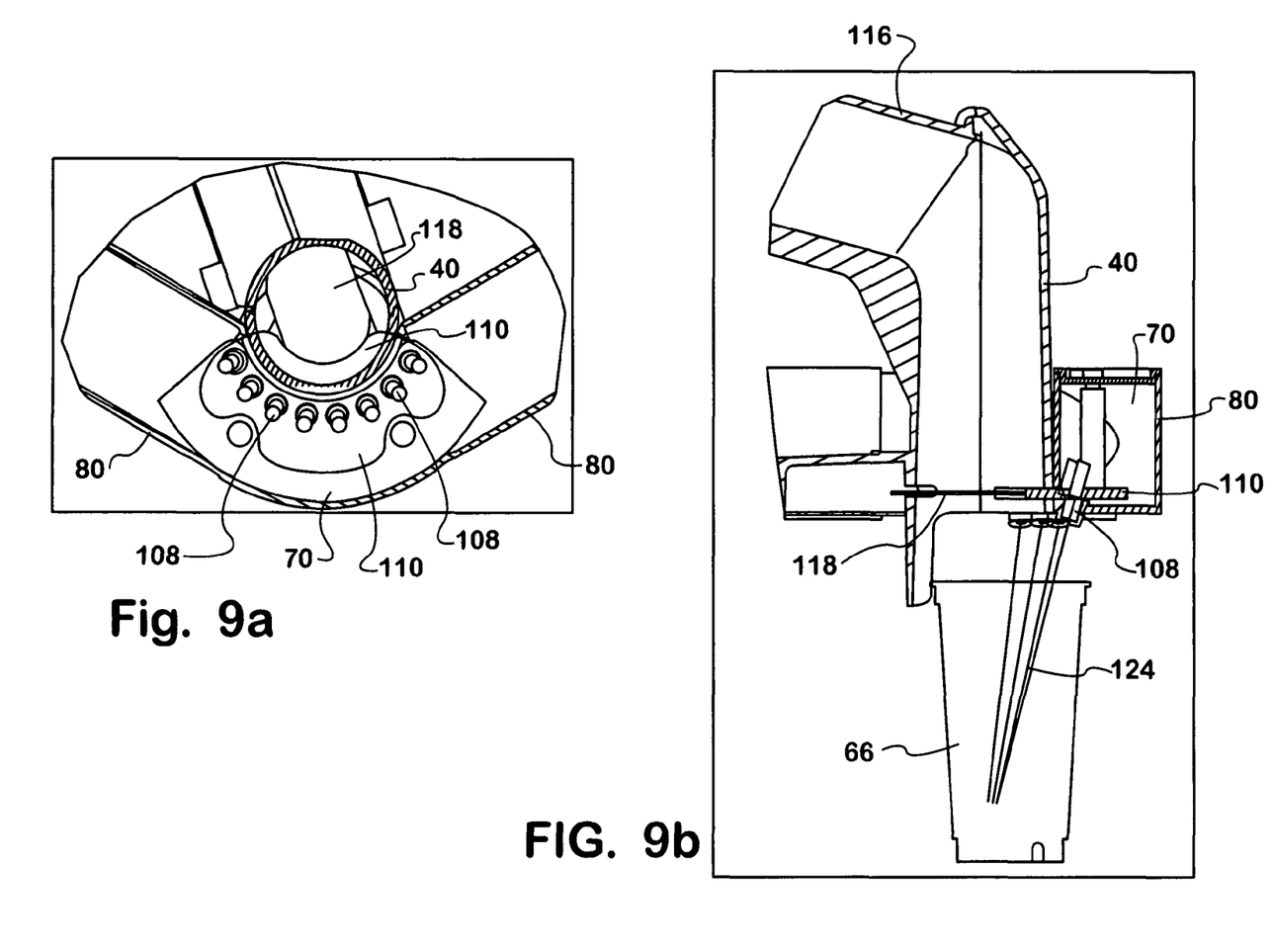
FIGS. 9a-b are views of the embodiment of the invention as pictorially shown in FIGS. 8a-d.

When the ice chute 40 is filled with ice from the bin 112 and the ice chute gate 118 is extended into the chute to close the chute, as best seen in FIGS. 8c-d and 9b some of the ice in the chute will rest on and be in contact with an upper surface of the portion of the thermally conductive member 110 that extends into the chute. This results in chilling by the ice of the portion of the thermally conductive member that is in the chute and, through thermal conduction, chilling of the portion of the member that is in the duct 80 and in contact with the beverage dispense valves 108 and air in the duct 80 as heat is transferred from the member to the ice. Consequently, the member 110 heat transfer couples the ice to each of the beverage dispense valves 108 and air in the duct 80 at the point of delivery 70, whereby the ice chills the beverage ingredients flowed to the point of delivery. Lines 124 indicate the flow paths of beverage ingredients dispensed by the valves 108 into the container 66.

The invention therefore provides improved techniques for maintaining beverage ingredients for a smoothie in a chilled state as the ingredients are delivered from chilled supplies thereof in a cabinet of a smoothie machine to a point of delivery of the ingredients remote from the supplies.

While embodiments of the invention has been described in detail, various modifications and other embodiments thereof may be devised by one skilled in the art without departing from the spirit and scope of the invention, as defined in the appended claims.

What is claimed is:

1. An apparatus for dispensing iced beverages, the apparatus comprising:
    a dispensing station for dispensing ice and beverage ingredients to a container;
    a conduit configured to deliver one of the beverage ingredients to the container at a point of delivery in the dispensing station;
    a beverage dispense valve configured to control delivery of the beverage ingredient to the container;
    an ice bin configured to hold the ice;
    an ice dispense chute configured to deliver the ice from the ice bin to the container via the dispensing station;
    a thermally conductive member; and
    a gate that is configured to control delivery of the ice via the ice dispense chute, wherein the gate is movable between a closed position wherein the gate engages the thermally conductive member to prevent ice delivery via the ice dispense chute and an open position wherein the gate is spaced apart from the thermally conductive member to allow ice delivery via the ice dispense chute;
    wherein the thermally conductive member comprises a first portion that is located inside of the ice dispense chute and a second portion that is located outside of the ice dispense chute at the point of delivery; and
    wherein the first portion of the thermally conductive member is configured to heat transfer couple the ice in the ice dispense chute to the second portion of the thermally conductive member so as to cool the beverage dispense valve at the point of delivery.

2. An apparatus for dispensing iced beverages, the apparatus comprising:
    a dispensing station for dispensing ice and beverage ingredients to a container;
    a plurality of conduits configured to deliver the beverage ingredients to the container at a point of delivery in the dispensing station;
    plurality of beverage dispense valves configured to control delivery of the beverage ingredients to the container;
    an ice bin configured to hold the ice;
    an ice dispense chute configured to deliver the ice from the ice bin to the container via the dispensing station;
    a thermally conductive member having a first portion that is located inside of the ice dispense chute and a second portion that is located outside of the ice dispense chute at the point of delivery, wherein the first portion of the thermally conductive member is configured heat transfer couple the ice in the ice dispense chute to the second portion of the thermally conductive member so as to cool the plurality of beverage dispense valves at the point of delivery; and
    a gate that is configured to control delivery of the ice via the ice dispense chute, wherein the gate is movable between an open position wherein ice delivery via the ice dispense chute is allowed and a closed position wherein ice delivery via the ice dispense chute is not allowed; and wherein when the gate is in the closed position, the gate and the thermally conductive member together prevent ice delivery via the ice dispense chute.

3. The apparatus according to claim 2, wherein the gate closes against the thermally conductive member when the gate is moved into the closed position.

4. The apparatus according to claim 3, wherein the gate and the thermally conductive member have surfaces that are complementary in shape and that face each other when the gate is moved into the closed position.

5. The apparatus according to claim 2, wherein the second portion of the thermally conductive member defines a plurality of passages into which the plurality of beverage dispense valves extend.

6. The apparatus according to claim 2, wherein the first portion of the thermally conductive member has an upper surface that supports the ice in the ice dispense chute, which results in chilling of the first portion and, via thermal conduction, chilling of the second portion.

7. The apparatus according to claim 6, wherein the second portion is in contact with the plurality of beverage dispense valves.

8. The apparatus according to claim 2, further comprising a duct in which the plurality of valves are disposed, wherein the thermally conductive member extends through both the ice dispense chute and the duct.

9. The apparatus according to claim 2, wherein the thermally conductive member is made of aluminum.

10. The apparatus according to claim 2, further comprising a controller that is configured to control the plurality of valves and the gate to deliver particular quantities of the beverage ingredients and the ice to the container.

11. The apparatus according to claim 10, further comprising a user interface coupled to the controller for controlling the plurality of valves and ice dispense chute.

* * * * *

UNITED STATES PATENT AND TRADEMARK OFFICE
CERTIFICATE OF CORRECTION

PATENT NO. : 9,127,881 B2  
APPLICATION NO. : 12/802409  
DATED : September 8, 2015  
INVENTOR(S) : Douglas Anderson et al.

It is certified that error appears in the above-identified patent and that said Letters Patent is hereby corrected as shown below:

On the Title Page of the patent, at Item (73) Assignee: "Comehus, Inc." should instead read --Cornelius, Inc.--

Signed and Sealed this
Sixteenth Day of February, 2016

Michelle K. Lee
*Director of the United States Patent and Trademark Office*